June 2, 1964

W. P. BOOTHROYD 3,135,824

SHIFT OF COLOR BALANCE IN INDEXING TUBE BETWEEN MONOCHROME AND COLOR RECEPTION

Filed Feb. 1, 1960

2 Sheets-Sheet 1

INVENTOR.
WILSON P. BOOTHROYD

BY

Nelson E. Kimmelman
ATTORNEY

INVENTOR.
WILSON P. BOOTHROYD
BY
Nelson E. Kimmelman
ATTORNEY

United States Patent Office 3,135,824
Patented June 2, 1964

3,135,824

SHIFT OF COLOR BALANCE IN INDEXING TUBE BETWEEN MONOCHROME AND COLOR RECEPTION

Wilson P. Boothroyd, Huntingdon Valley, Pa., assignor, by mesne assignments, to Philco Corporation, Philadelphia, Pa., a corporation of Delaware Filed Feb. 1, 1960, Ser. No. 5,861
11 Claims. (Cl. 178—5.4)

Figure 1:
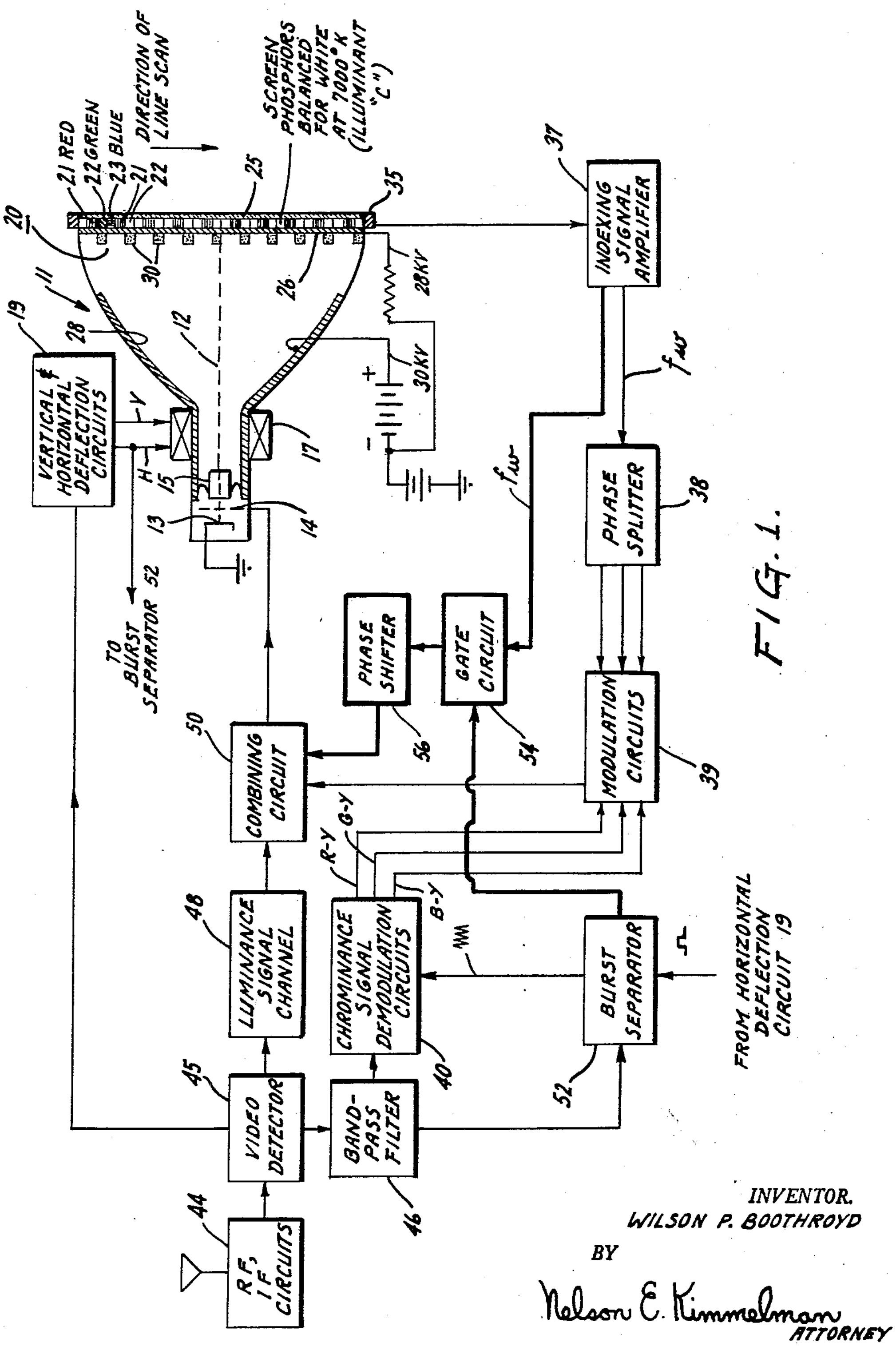

This invention relates to cathode ray tube systems and in particular to such systems used for the reproduction of images televised in color.

The invention is particularly useful in improving the quality of images produced by television sets designed for the reception and reproduction of both monochrome and color television programs such as those currently transmitted in the United States. Color television receivers presently available on the commercial market generally employ display devices for reproducing televised scenes which are so constructed and operated that the colors, including white, of the image which they reproduce generally correspond to the color standards used in determining the formation of the color television signals that are transmitted. The transmitted signal corresponding to the color of a televised object that has a color temperature of 7000° K., i.e., the white known as "illuminant C," is composed of prescribed proportions of red, green and blue representative components. These proportions are so chosen as to enable a "standard" receiver to produce a white-colored element also having a temperature of 7000° K. The transmitted signal thus permits the whites, as well as the other colors of the image, to be faithful to those of the televised scene.

The "standard" receiver contains a display device such as a cathode ray tube which is so constructed and/or operated that it will produce white at 7000° K. when the incoming signal corresponds to the scanning of illuminant C at the transmitter. This construction and/or operation of the display device is known as "white balancing" and may be accomplished, for example, by proportioning the fluorescent elements of the screen relative to one another in such a way that whites having a color temperature of 7000° K. are produced when the screen is scanned. Alternatively, it may be accomplished by adjusting the relative efficiencies of the sets of phosphor elements, and by other means which will be discussed hereinafter.

As stated before, when whites at 7000° K. are reproduced by the display device to match the whites of the scene televised, all of the other elements of those scenes, and flesh tones in particular, are usually reproduced with good color fidelity. However, when a receiver using a display device "white balanced" at 7000° K. is used to reproduce scenes which have been televised for monochrome transmission the images produced may be tinged by a yellowish green color which is neither esthetically pleasing nor easy on the eyes. This fact was recognized early in the development of the television industry by monochrome receiver manufacturers who thereupon incorporated in their sets cathode ray tubes having phosphor screens so constructed that the whites and gradations thereof in the reproduced image did not have a color temperature of 7000° K. (illuminant C) but were instead "white balanced" to have a greater content of blue, i.e., the whites had a color temperature in the neighborhood of 8500° K. Ambient light falling upon images having this bluish tinge did not produce yellowish-green tinged images and appeared to have a greater contrast ratio thereby making the picture easier on the eyes. One possible explanation for this phenomenon may lie in the fact that the eye tends to adapt rather easily to yellow and its acuity thereto becomes compressed so that the apparent range of contrast is diminished. However, the blue receptors of the eye not only have the ability to distinguish blue components of the image more readily, but are also less liable to have their acuity compressed so that the eye effectively perceives a greater range of contrast.

By thus white balancing the screen of the cathode ray tube at 8500° K. good black and white pictures were obtained at the expense of the quality of color pictures produced by the same tube, however. This is due to the fact that a screen so constructed causes certain color infidelities to be produced which are especially noticeable in the rendition of flesh tones. Since flesh tones are generally considered to be the most visually critical parts of the colored image, the observer did not find the image pleasing to the eye.

It is therefore an object of the present invention to provide a system whereby both monochrome and color television scenes may be reproduced with optimum characteristics.

Another object of the invention is to provide a receiver system for producing monochrome images which are less susceptible to the adverse visible effects of ambient light and capable of producing colored images having good overall color fidelity.

Still another object of the present invention is to provide a compatible color television receiver which is capable of producing easily visible monochrome images and accurate flesh tones in color television images.

These objects, as well as others which will appear, are achieved, according to my invention by providing, in a compatible color television receiver, means for automatically producing two modes of operation corresponding to the reception of monochrome signals and color television signals respectively. When monochrome signals are received I provide means for making the whites of the image somewhat bluish (they will have a color temperature of about 8500° K. for example), whereas when color television signals are received the apparatus causes all colors of the reproduced image including white to be somewhat modified in the direction of yellow (i.e., white as reproduced will have a color temperature of about 7000° K., the temperature of illuminant C). In general I accomplish this shift in the effective color balance of the reproduced image by constructing the fluorescent screen of the display device so as to produce whites having a predetermined color temperature for one mode of operation, and then modifying the beam (or beams) of the scanning device in the other mode of operation in such a way that the conjunctive effect of the beam-modification and the screen characteristics is to produce whites having a different color temperature. For example, in one form of the invention as used in conjunction with a display device of the so-called "Apple" type, which is described in U.S. Patent No. 2,644,855 issued to W. E. Bradley on July 7, 1953, I provide a fluorescent screen which is so constructed that when scanned by a beam of constant amplitude, it produces whites having a color temperature of 7000° K. Thus, during the reception of color television signals the whites of the image have a color temperature of 7000° K. (illuminant C), and the other colors of the image are correspondingly affected. During the reception of monochrome signals, on othe other hand, an auxiliary signal is added to the video signal that is customarily used to modulate the beam which thereupon produces images having whites at a color temperature of 8500° K.

In another form of the invention the screen is so constructed that when scanned by a beam of constant amplitude it produces whites having a color temperature of about 8500° K. (bluish white) so that when monochrome signals are received the images appear more pleasing to the eye. However, when color television signals are being received I provide for the generation of an oscillatory wave which is used to modulate the beam in such a way that, in conjunction with the aforesaid characteristics of the fluorescent screen, the color temperature of white in the reproduced colored image is lowered to about 7000° K. (illuminant C) and the rendition of other colors, especially flesh tones, is improved substantially.

Still other forms of the invention are possible as will be explained hereinafter.

Figure 2:
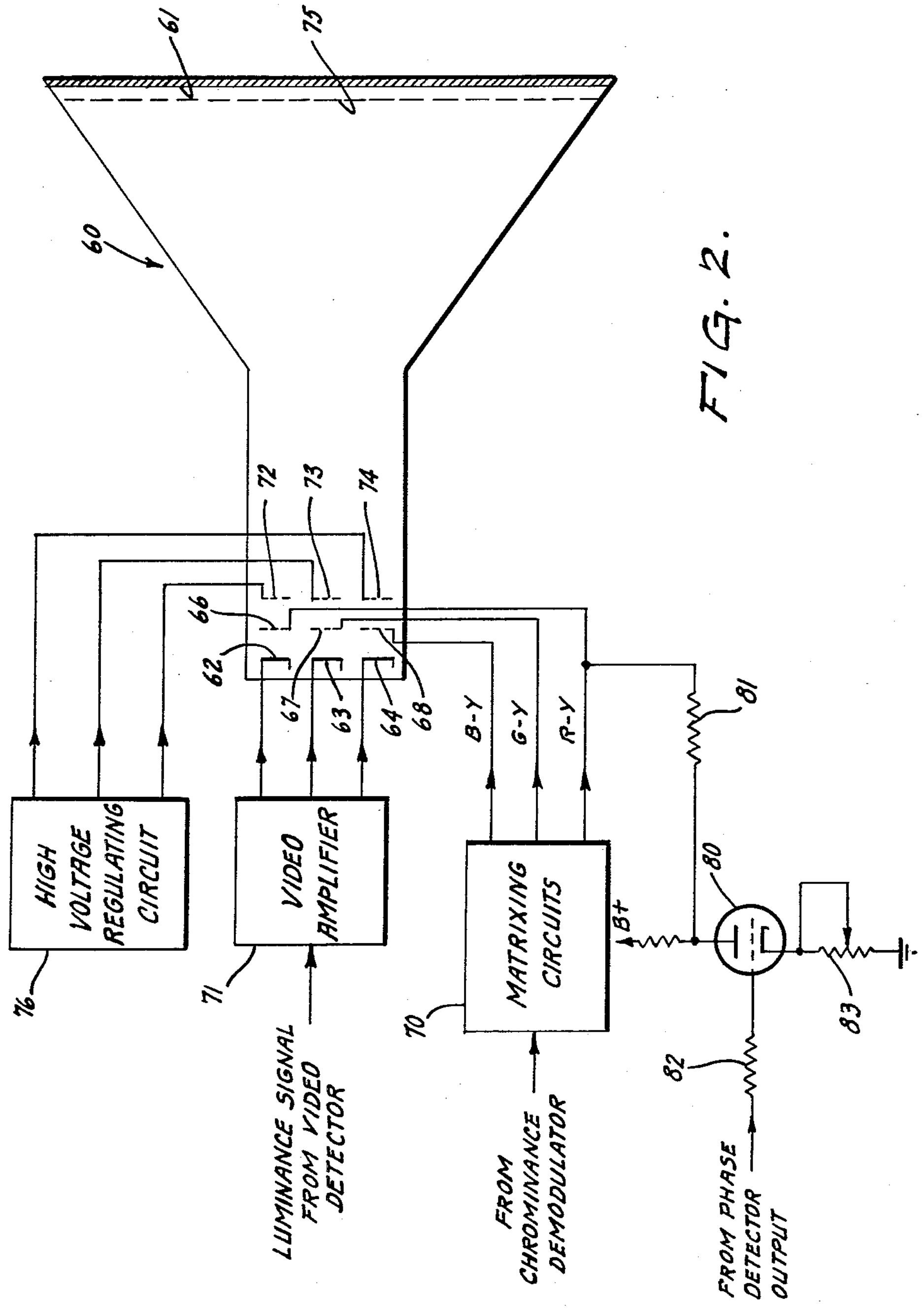

The above-mentioned and other forms of the invention will be described in greater detail with reference to the drawings in which:

FIGURE 1 is a block and schematic diagram showing one form of my invention as used with an "Apple" tube; and FIGURE 2 is a block and schematic diagram of another form of my invention as used with an "aperture mask" type of tube.

Referring to FIGURE 1 a cathode ray tube system of the "Apple" type is shown and the invention will be explained primarily with reference thereto. The system illustrated therein includes conventional radio frequency and intermediate frequency circuits indicated by the block 44 which supplies an output IF signal to a conventional video detector 45. The detector 45 produces a plurality of output signals, one of which is known as the "luminance" component which contains information corresponding to the brightness of the elements being scanned. This luminance component is amplified and otherwise processed in luminance signal channel 48 whence it is applied to one input of the combining circuit 50. Another signal produced by the video detector 45 is applied via bandpass filter 46, which passes frequencies in the region between approximately 2.5–4.1 mc., i.e., the band containing the "chrominance components" of the received signal, to the chrominance signal demodulation circuits 40. The chrominance components comprise a phase and amplitude modulated color subcarrier at 3.58 mc. containing the hue and saturation information present in the televised scene.

In order to obtain proper rendition of the colors of the scene televised it is important that the demodulation of the chrominance components be extremely precise. Since synchronous detection is used, it is necessary that a reference wave at the subcarrier frequency having a stabilized reference phase be combined with the chrominance components. Within the demodulation circuits 40 is a local sine wave oscillator for producing a wave at 3.58 mc. which is phase-controlled in response to the phase of the incoming "burst." To extract the "burst" a portion of the output wave from filter 46 is applied to one input of a burst separator 52 which may be of conventional construction. To the other input of separator 52 a gating pulse from the horizontal section of the deflection circuits 19 is applied during the occurrence of the "back porch" section of the horizontal blanking pulse in order to extract the burst from the rest of the composite color video signal. The extracted burst is then used to lock the phase of the local oscillator in the demodulation circuits 40.

In a typical form, the local oscillator in circuit 40 supplies a wave at the burst frequency and phase to two phase shifters whose outputs are respectively coupled to the inputs of two synchronous demodulators. The filtered chrominance components are also applied to the demodulators which thereupon produce two output signals, the so-called "$R-Y$" and "$B-Y$" signals. The demodulation circuits 40 also include matrixing circuits that may consist of conventional resistive adding circuits and polarity inverters so arranged that a third signal "$G-Y$" is generated from appropriate portions of the $R-Y$ and $B-Y$ signals in a conventional manner. The three signals $R-Y$, $B-Y$, and $G-Y$ may then be applied, for example, to modulation circuits 39 where they are used to modulate different phases of a signal $f_W$ as will be explained below. This remodulation process is necessary to adapt the characteristics of the standard color signal to a single image-forming beam display device. The process entails supplying three differently phased waves of the signal $f_W$ to the modulation circuits 39 where they are respectively modulated by the $R-Y$, $G-Y$ and $B-Y$ signals. The differently phased waves are derived from the phase splitter 38 to which an indexing signal $f_W$ from amplifier 37 is supplied.

The signal $f_W$ is derived by the scanning of the beam 12 over the indexing strips 30. It is often termed the "writing signal" because it is used, together with the luminance signal, to modulate the scanning beam 12 to reproduce the chrominance information. The indexing signal itself is derived by the scanning of the beam 12 over the indexing strips 30 and will have phase variations due to changes in the rate at which strips 30 are traversed by beam 12 or due to irregularities in the spacing between them. The three modulated color-difference signals are also combined, within circuits 39, into a single composite output wave comprised of successive samples of the color representative waves.

The composite output signal of circuits 39 is then applied to one input of the combining circuit 50 to which, as has already been stated, the luminance component from channel 48 is also applied. The combining circuit 50 produces, in response to the two input signals applied thereto, a beam modulating signal which represents, in successive intervals, the intensity of the red, green and blue elements of the televised scene taken in a predetermined sequence. The output signal of the combining circuit 50 is applied to the control grid 14 of the cathode ray tube 11 to modulate the electron beam 12 which emanates from the cathode 13 thereof. The intensity of the beam 12, therefore, is a function of the intensity of the red, green and blue elements of the scene televised. The beam is accelerated and focussed by focussing electrodes 15.

The beam 12 is deflected over the beam-intercepting structure 20 (in the direction shown) in a series of essentially parallel horizontal paths, which are generally perpendicular to the direction in which said strips extend, in response to deflection fields produced by energization of the vertical and horizontal portions of the conventional deflection yoke 17. Appropriate vertical and horizontal deflection waves are supplied to the respective sections of the yoke 17 from the deflection circuits 19 which are trigged by deflection signals detected in the video detector 45.

The screen structure 20 of the "Apple" tube 11 consists of a number of sets of vertical phosphor strips 21, 22 and 23 respectively emissive of red, green and blue light when struck by the electron beam 12 which are arranged in a regularly recurrent pattern on the inner surface of the faceplate 25 of the tube 11.

On the back of the phosphor strips a layer 26 of an electron-permeable and conductive material such as aluminum is deposited which serves to prevent degenerative discoloration of the phosphor strips by ion bombardment and, if also reflective, helps to increase the brightness of the image as seen by a viewer. The layer 26 may be at a potential of about 28 kv., for example.

Behind the aluminum layer 26 a number of indexing elements 30 are disposed which may take the form, for example, of vertical elongated strips situated in a predetermined spatial relation to various ones of the phosphor strips 21, 22 and 23 say, for example, opposite selected ones of the green-emissive strips 22. These indexing elements may consist of a material which has a secondary emission ratio different from that of the other parts of the structure 20. Alternatively, the indexing elements may consist of a material which emits radiation of a particular wavelength that is then detected by devices such as photo-electric cells which are sensitive thereto. In either case an electrical indexing signal is produced which provides information as to the relative position of the beam in the course of its scanning and which is used to effect coordination of the modulation of the beam 12 with its position on the screen. Thus, when the beam is impinging on a red-emissive strip 21, for example, it will be modulated by a signal which is representative of the intensity of the redness of the element of the scene being televised.

In the system shown in FIG. 1 the indexing strips 30 are comprised of a secondarily emissive material which releases electrons that are attracted to the more positive (i.e., 30 kv., for example) second anode coating 28 deposited on the inner surface of the bell portion of the tube 11. Loss of secondary electrons from the indexing strips 30 drives the layer 26 more positive. Since the glass envelope acts as a dielectric between the layer 26 and the conductive ring 35 positioned around the rim of the faceplate, a displacement current corresponding to the change in charge is set up and is coupled from the ring 35 and then applied to an indexing signal amplifier 37.

According to my invention, apparatus is shown in FIG. 1 which causes the receiver system therein to operate in a mode of operation, when monochrome television signals are received, which is different from its mode of operation when color television signals are received. In accordance with the form of my invention depicted in FIG. 1 the structure 20 is so constructed that when the phosphor strips 21, 22 and 23 thereof are traversed by the beam 12 when it has a fixed amplitude and is moving at its normal scanning speed, a trace of white will appear on the screen which has a color temperature of about 7000° K. Another way of stating this is to say that the screen is "white-balanced" at illuminant C. It has been found that a screen so balanced enables the receiver to produce, in response to color television signals, colored images whose constituent elements, and especially flesh tones, are faithful to the colors of the televised scene.

In its first mode of operation the system shown in FIG. 1 operates as follows. When the received signal represents a color television program the chrominance signal is demodulated to produce, $R-Y$, $G-Y$ and $B-Y$ signals which are used in modulation circuits 39 as explained above. The presence of burst in the signal "closes" the gate circuit 54 thereby preventing any signal from amplifier 37 from being applied to modulate the beam. Hence, the natural white balance characteristic of the screen 20 is used, i.e., 7000° K., which makes for good color fidelity.

When the receiver of FIG. 1 is receiving monochrome signals, however, neither chrominance components nor the "burst" of the color subcarrier appears in the incoming signal and the system will operate in its second mode. Consequently, neither the demodulation circuits 40 nor the modulation circuits 39 will produce any output signal so that only the luminance signal detected by the video detector 45 is applied via the combining circuit 50 to modulate the beam 12. As previously stated, since the screen 20 is constructed so as to have a "white balance" point at 7000° K., it does not produce optimum images in black and white. Accordingly, the system of FIG. 1 is constructed to operate with an effective white balance of about 8500° K. when it senses the reception of monochrome signals.

I accomplish this change, in the form of the invention shown in FIG. 1, by modulating the beam 12 by an auxiliary oscillatory wave which effectively pushes up the white-balance point of the display tube to about 8500° K. so that the whites of the monochrome image will have a barely perceptible tinge of blue. For this purpose a conventional gate circuit 54 is provided via which the indexing signal $f_W$ from amplifier 37 is supplied to the combining circuit 50, the phase shifter 56, and thence to the grid 14 whenever the gate 54 is "open," i.e., whenever the absence of burst is detected in separator 52. The phase shifter 56 shifts the phase of the $f_W$ signal to the extent necessary to cause whites produced on the beam-intercepting structure 20 to have the desired color temperature of 8500° K. In the case illustrated the phase of the $f_W$ will be such as to accentuate the blue-emissive phosphor strips 23. The shifter 56 may either precede or follow the circuit 54. The output wave of the shifter 56 is added to the luminance signal in combining circuit 50 and the combined waves are then applied to grid 14 for modulating beam 12 thereby. In order to maintain the proper white balance (8500° K.) for all monochrome signal levels, the auxiliary signal may be modulated in a special modulator stage (not shown) by the monochrome signal before being combined with the latter. Hence when black-and-white broadcasts are received, the receiver produces bluish-white images which have been found to be less susceptible to visual interference from ambient light and which appear to the eye to have greater contrast.

Thus it is seen that receivers employing the present invention can produce images with an optimum white balance characteristic for color television broadcasts, and an optimum effective white balance for black-and-white broadcasts.

The invention, of course, may take a variety of other forms. One form, for example, is the converse of the form previously explained, i.e., the phosphors of the screen are so adjusted that the screen is white-balanced at 8500° K. when used for monochrome image reproduction, but when color television signals are received the images produced have an effective white balance of 7000° K. The latter mode of operation is accomplished by adding an auxiliary wave of the requisite phase to the signal used to modulate the beam when color television signals are received so that images produced in response thereto have whites which are at 7000° K. (illuminant C), and have their other color components modified accordingly.

In this alternative embodiment, when burst is present in the received signals the gate 54 is "open" and an auxiliary wave from indexing amplifier 37 is fed via phase shifter 56, to the combining circuit 50 where it is added to the chrominance and luminance components to effect the desired color and white modification. In order to maintain the proper relationship of luminance to chrominance in the signal applied to grid 14, it may be found to be desirable to modulate the intensity of the auxiliary wave to correspond to the variations in the amplitude of the luminance signal from channel 48. This will tend to maintain the proper saturation of the colors in the reproduced image. This can be done, for example, by providing a modulating stage between the phase shifter 56 and the combining circuit 50 and applying the luminance signal from channel 48 thereto.

On the other hand, when burst is absent during monochrome transmissions the gate circuit 54 is closed in response to an appropriate signal indicative of the absence of burst so that the wave from amplifier 37 is not applied to modulate the beam 12 and hence the screen, being white-balanced at 8500° K., operates to produce the bluish-white monochrome images that have been found superior from the standpoint of visibility as explained above.

In still another form of the invention (not shown) the fluorescent portion of the structure 20 may be so constructed as to have a natural white balance temperature somewhere between, or alternatively, higher or lower than the two color temperatures hitherto mentioned. In such a case, an auxiliary color-balance adjusting wave would have to be added during both modes of operation, i.e., when color television signals were received the wave applied from the indexing amplifier 37 to the combining circuit 50 would have to have a certain phase to produce images wose whites have a color temperature of 7000° K. and a different phase when monochrome signals are received so as to produce images having whites at about 8500° K.

It should also be mentioned that the system is not limited just to single beam types of "Apple" display tubes but can easily be adapted for use with double beam systems, i.e., ones in which one beam is used for producing the image and the other, which is usually modulated at a single frequency and is deflected in unison therewith, is used to provide indexing signals which can be separated more easily from the picture signals. In this form the auxiliary signal would be used, of course, to modulate the image-producing beam.

FIGURE 2 shows how the invention may be used with a display tube of the so-called "aperture-mask" type. Such tubes are commonly used in conventional color television receivers such as the Philco chassis TV–123 and it is in part of this illustrative environment that the tube 60 is shown. The latter contains a fluorescent screen 61 composed of three sets of phosphor dots which fluoresce in red, green and blue colors respectively, when struck by electrons. They are arranged in groups of "triads" of three adjacent phosphor dots emissive of respectively different colors located approximately at the apices of imaginary equilateral triangles. Three cathods 62, 63 and 64, to which the luminance signal amplified in video amplifier 71 is applied, produce three electron beams each of which is modulated by intelligence corresponding to the red, green and blue colored elements in the televised scene. Three control grids 66, 67 and 68 are situated in front of the cathodes 62, 63 and 64 respectively, and in response to the application thereto of the color difference signals, $R-Y$, $G-Y$ and $B-Y$, from matrixing circuits 70 control the respective intensities of the beams produced by each of the cathodes. Biasing circuits (not shown) are also provided in connection with the control grids for establishing the operating potentials thereof. Three screen grids 72, 73 and 74 are also provided which are coupled to the high voltage regulating circuit 76. Adjustment of the screen grid voltage for effectively determining the characteristics of the output current versus control grid voltage curve is made when the tube is "white balanced."

The three beams produced by the three electron guns are deflected in unison by deflection apparatus (not shown) over the screen structure 61 through an "aperture-mask" 75 which has the same number of openings therein as there are triads of phosphor dots on the screen 61. Each aperture is aligned with a corresponding triad and serves to permit only the beam modulated by intelligence representative of a given color to strike a phosphor dot emissive of that color.

In accordance with the invention means are provided for changing the color or "white balance" point of the tube when monochrome and color television signals are applied. It will be assumed, in the first instance, that the voltages applied to the various elements of the electron guns are so selected that for equal signal input a white is produced on the screen 61 which has a color temperature of about 8500° K. While this white is very good for black and white images it is not optimum for color reproduction and it is therefore desirable to modify the relative proportions of the various beam currents so as to lower effectively the temperatures of the component colors (including white) of the image. In the form shown in FIG. 2 this objective is accomplished by increasing the proportion of the red beam current relative to the other beams. An amplifier tube 80 is shown whose anode is connected to B+ and, through a resistor 81, to the "red" beam control grid 66. The grid of tube 80 is connected by a resistor 82 to a reference point in the output of the conventional phase detector (not shown) that is used to compare the phase of burst with the locally generated 3.58 mc. wave. When burst is present in the received television signal, the potential of the reference point is more negative than when it is not. Therefore, as the grid goes more negative the plate of tube 80 goes more positive so that the grid 66 goes more positive and the red beam current increases thereby decreasing to 7000° K. the color temperature of the white produced when the incoming signal represents a televised white. Conversely, when the incoming signal does not contain burst the potential of the reference point will go more positive causing the plate of tube 80 and the grid 66 to go more negative thereby reducing the relative proportion of red beam current so that the color temperature of the reproduced white returns to 8500° K.

Of course the opposite manner of operation may be effected by adjusting the white balance point at 7000° K. when a color signal is received and raising it to 8500° K. when a monochrome signal is received. To accomplish this the usual bias circuits for the control grids are so set, and the auxiliary bias supplied from tube 80 is so adjusted that more red beam current is used when a color signal is received than when a monochrome signal is used. Accordingly, the grid of tube 80 is connected to a point in the output of the phase detector which goes to a more positive (less negative) potential when a monochrome signal without burst is received. When the grid goes more positive the plate of tube 80 and the control grid 66 go more negative thereby decreasing the relative amount of the red beam current which raises the color temperature of the reproduced white elements to about 8500° K. The potentiometer 83 in the cathode circuit of tube 80 is provided for adjustment of the amount of increment or decrement in the red beam bias, as the case may be, that is required to effect the change in color temperature of white.

It will be understood that still other applications of the apparatus according to the diverse forms of my invention described herein will occur to those skilled in the art. Consequently, I desire the scope of this invention to be limited only by the following claims.

I claim:

1. A receiver for reproducing monochrome and color television images of televised scenes, said receiver comprising a cathode ray tube in which an image-forming electron beam is produced and in which a fluorescent screen is disposed, said screen being constructed to produce white having a color temperature of about 7000° K. when scanned by an electron beam of constant amplitude, said screen also including a plurality of beam-position-indexing elements which generate an indexing signal when scanned by an electron beam, means for modulating said image-forming beam, means for applying to said modulation means, when a color television signal is applied to said receiver, a first modulating signal which includes luminance and chrominance components of said color television signal, means for applying to said modulating means, when said monochrome signal is applied to said receiver, a second modulating signal corresponding to said monochrome signal, and means for applying to said modulating means, when said monochrome signal is applied to said receiver, a third modulating signal which has a predetermined nominal frequency and phase, said last-named means comprising means for permitting said indexing signal to be applied to said beam-modulating means only when said monochrome signal is applied to said receiver and also comprising means to determine the phase of said applied indexing signal, said applied third modulating signal and said screen conjunctively being operative to produce monochrome images having whites with a color temperature of about 8500° K.

2. In a television receiver adapted to receive both color and monochrome image signals, an image-producing cathode ray tube wherein an electron beam scans a screen having elements emissive of light of different colors in response to electron impingement, said screen having a predetermined white balance and also having indexing elements thereon, means including said indexing elements for producing an indexing signal, means for effecting modulation of said beam according to the image information of either a received color image signal or a received monochrome image signal, and means for additionally modulating said beam with said indexing signal at least during reception of one of said types of image signals so as to change the white balance for the received signal.

3. A television receiver according to claim 2, wherein said beam is modulated with said indexing signal only during reception of a preselected one of said types of image signals.

4. A television receiver according to claim 2, wherein said beam is modulated with said indexing signal only during reception of a monochrome image signal.

5. In a television receiver adapted to receive both color and monochrome image signals, an image-producing cathode ray tube wherein an electron beam scans a screen having elements emissive of light of different colors in response to electron impingement, said screen being constructed to have a predetermined white balance for one of said types of image signals, said screen also having indexing elements thereon, means including said indexing elements for producing an indexing signal, means for modulating said beam with said indexing signal so as to change the white balance for the other of said types of image signals, means for preventing said beam modulation during reception of said one type of image signal, and means for modulating said beam according to the image information of a received image signal of either of said types.

6. A television receiver according to claim 5, wherein said prevention means comprises gating means, and means for closing said gating means during reception of said one type of image signal and for opening said gating means during reception of said other type of image signal.

7. In a television receiver adapted to receive both color and monochrome image signals, an image-producing cathode ray tube wherein an electron beam scans a screen having elements emissive of light of different colors in response to electron impingement, said screen being constructed to have a predetermined white balance for color image signals, said screen also having indexing elements thereon, means including said indexing elements for producing an indexing signal, means for modulating said beam with said indexing signal so as to change the white balance for monochrome image signals, means for preventing said beam modulation during reception of color image signals, and means for modulating said beam according to the image information of a received image signal of either of said types.

8. A television receiver according to claim 7, wherein said prevention means comprises gating means, and means for closing said gating means during reception of color image signals and for opening said gating means during reception of monochrome image signals.

9. In a television receiver adapted to receive color image signals including a color reference burst and also to receive monochrome image signals, an image-producing cathode ray tube wherein an electron beam scans a screen having elements emissive of light of different colors in response to electron impingement, said screen being constructed to have a predetermined white balance for one of said types of image signals, said screen also having indexing elements thereon, means including said indexing elements for producing an indexing signal, means for modulating said beam with said indexing signal so as to change the white balance for the other of said types of image signals, means for detecting the presence or absence of said burst in a received image signal, means controlled by said detecting means for preventing said beam modulation during reception of said one type of image signal, and means for modulating said beam according to the image information of a received image signal of either of said types.

10. In a television receiver adapted to receive color image signals including a color reference burst and also to receive monochrome image signals, an image-producing cathode ray tube wherein an electron beam scans a screen having elements emissive of light of different colors in response to electron impingement, said screen being constructed to have a predetermined white balance for color image signals, said screen also having indexing elements thereon, means including said indexing elements for producing an indexing signal, means for modulating said beam with said indexing signal so as to change the white balance for monochrome image signals, means for detecting the presence or absence of said burst in a received image signal, means controlled by said detecting means for preventing said beam modulation during reception of color image signals, and means for modulating said beam according to the image information of a received image signal of either of said types.

11. A television receiver according to claim 10, wherein said detecting means comprises a burst separator, and said prevention means comprises a gating circuit controlled by said burst separator.

References Cited in the file of this patent

UNITED STATES PATENTS

| | | |
|---|---|---|
| 2,744,155 | Kihn | May 1, 1956 |
| 2,790,847 | Houghton | Apr. 30, 1957 |
| 2,952,736 | Larkey et al. | Sept. 13, 1960 |
| 2,955,152 | Keizer | Oct. 4, 1960 |
| 2,974,189 | Booyhroyd | Mar. 7, 1961 |